United States Patent
Caillaud et al.

(10) Patent No.: US 7,268,508 B2
(45) Date of Patent: Sep. 11, 2007

(54) DIRECT CURRENT MOTOR CONTROL CIRCUIT AND WIPER SYSTEM USING SAID CIRCUIT

(75) Inventors: Dominique Caillaud, Châtellerault (FR); Franck Vallet, Châtellerault (FR); Nicolas Granger, Poitiers (FR)

(73) Assignee: Valeo Systemes d'Essuyage, La Verriere (FR)

( * ) Notice: Subject to any disclaimer, the term of this patent is extended or adjusted under 35 U.S.C. 154(b) by 84 days.

(21) Appl. No.: 10/545,698

(22) PCT Filed: Feb. 12, 2004

(86) PCT No.: PCT/EP2004/001287

§ 371 (c)(1),
(2), (4) Date: Aug. 16, 2005

(87) PCT Pub. No.: WO2004/075390

PCT Pub. Date: Sep. 2, 2004

(65) Prior Publication Data

US 2006/0227475 A1    Oct. 12, 2006

(30) Foreign Application Priority Data

Feb. 21, 2003   (FR)   ................................. 03 02314

(51) Int. Cl.
*H02P 3/12*   (2006.01)

(52) U.S. Cl. ...................... 318/379; 318/434; 318/443; 388/903

(58) Field of Classification Search ................ 318/434, 318/443–444, 533, 375–381; 388/903, 917; 361/77, 84, 111, 117–118
See application file for complete search history.

(56) References Cited

U.S. PATENT DOCUMENTS

| | | | | |
|---|---|---|---|---|
| 3,611,092 | A | * | 10/1971 | Wilmunder .................. 318/248 |
| 3,660,738 | A | * | 5/1972 | Anderson et al. ........... 318/138 |
| 3,732,475 | A | * | 5/1973 | Geerling ..................... 318/275 |
| 3,818,296 | A | * | 6/1974 | Torii ........................... 318/247 |
| 3,848,169 | A | * | 11/1974 | Asano et al. ................ 318/376 |
| 4,054,821 | A | * | 10/1977 | Williamson .................. 318/375 |
| 4,633,154 | A | * | 12/1986 | Maeda ....................... 318/373 |
| 5,142,433 | A | | 8/1992 | Nishibe et al. |
| 5,519,557 | A | * | 5/1996 | Kopera et al. ................. 361/84 |
| 5,543,694 | A | * | 8/1996 | Tice ........................... 318/379 |
| 5,578,911 | A | * | 11/1996 | Carter et al. ................ 318/376 |
| 5,747,954 | A | * | 5/1998 | Jones et al. .................. 318/266 |
| 5,875,281 | A | * | 2/1999 | Thexton et al. ............. 388/801 |

* cited by examiner

*Primary Examiner*—Bentsu Ro
(74) *Attorney, Agent, or Firm*—Osha Liang LLP

(57) ABSTRACT

The invention relates to a direct current motor control circuit. The invention also relates to the use thereof in a windscreen wiper system for vehicles. An MOS FET transistor with an anti-parallel diode (M3) is serially mounted on the braking system (M2) of the control circuit.

9 Claims, 2 Drawing Sheets

DIRECT CURRENT MOTOR CONTROL CIRCUIT AND WIPER SYSTEM USING SAID CIRCUIT

The present invention relates to a control circuit for controlling a direct current (DC) electric motor.

It also relates to the use of such a control circuit in a vehicle windshield wiper system.

In the state of the art, it is known that a DC motor can be powered by means of a "half-bridge" control circuit in which a metal oxide semiconductor (MOS) type transistor makes it possible to connect a power supply terminal of the motor to the positive terminal of a vehicle battery.

The other terminal of the DC motor is connected to the pack or to the negative terminal of the DC power supply source.

In the state of the art, such a control circuit is generally supplemented by a second MOS transistor that is connected between the ground connected to the pack and that terminal of the electric motor which is connected to the above-mentioned MOS transistor.

The second MOS transistor is generally dimensioned to receive little current, and it is activated, i.e. caused to conduct, only while the DC motor is in its braking phase.

For the remainder of the operating time, the second MOS transistor is put into its high-impedance state and sees no current, other than a leakage current, pass through its drain-source path.

Such a control circuit must be highly reliable.

Particularly during vehicle maintenance operations, reversing the polarities applied to the control circuit of the electric motor can give rise to destruction of the circuit because, in order to reduce the cost of such a control circuit, the second transistor that is activated during braking is a low-power transistor.

An object of the present invention is to propose means making it possible to protect such a circuit from polarity reversal.

In the state of the art, the problem of a component being destroyed by accidental polarity reversal has already been solved.

Reference can be made, in particular, to document U.S. Pat. No. 5,519,557 in which the protection is implemented on the basis of a power MOS transistor that is disposed in series with the device to be protected.

Reference can also be made to document WO-A-00/24107 which also uses a protection configuration implemented by using a power MOS transistor in series.

Finally, reference can be made to document EP-1,045,501 in which protection of the device is provided by a power MOS transistor that is connected in parallel with the load.

Essentially, such protection devices suffer from two drawbacks for which the invention provides remedies.

In the first drawback, failure of the protection device prevents the protected device from operating even if the polarities applied are appropriate.

In the second drawback, since they are situated outside the protected devices, such protection devices always constitute additional components that increase the cost of manufacturing and of assembling a device that is protected from polarity reversal.

The present invention remedies those drawbacks of the state of the art in that it provides a control circuit for controlling a DC electric motor from a biased DC voltage source, the control circuit being of the type including at least one controllable interrupter connected to the hot spot of the electric motor, and a brake circuit serving to apply a braking short-circuit for braking the DC electric motor. The invention is characterized in that the control circuit comprises a low-power component that is connected in series in the brake circuit and that has high impedance in the event of polarity reversal and low impedance in the event of correct polarity.

The invention also provides a vehicle windshield wiper system incorporating such a control circuit.

Other advantages and characteristics of the present invention will be better understood with reference to the accompanying figures, in which:

FIG. 1 shows an example of a conventional control circuit for controlling a DC electric motor that is more particularly for use in a vehicle windshield wiper system.

The control circuit essentially comprises two metal oxide semiconductor field effect (MOSFET) transistors, namely a first transistor M1 and a second transistor M2, connected in series between a power supply positive terminal 1 and the electrical ground generally constituted at the pack of the vehicle.

The positive terminal of the battery or of the on-board network is connected to the terminal 1 of the control circuit when said control circuit is in action.

The two MOS transistors are of the same type.

The source of the upper first transistor M1 is connected to the drain of the lower second transistor M2.

The drain of the upper first transistor M1 is connected directly to the terminal 1 of the control circuit while the common point between the first and the second transistors M1, M2 is connected to a first power supply terminal of the DC motor M.

The other terminal of the DC motor M is connected to ground or to the pack of the vehicle.

Each gate 2 and 3 of the transistors M1 and M2 is connected in turn to a drive circuit (not shown) which makes it possible to decode the commands coming from the driver station of the vehicle.

In a normal operating mode, an output terminal of the drive circuit is connected to the gate terminal 2 of the upper transistor M1 and is active when it is desired to switch on the motor M.

In this normal operating mode of the motor, a current i1 passes through the drain-source path of the first transistor M1, and then passes through the motor M to ground.

No current passes through the second transistor M2.

Conversely, another terminal of the drive circuit is connected to the gate 3 of the second transistor M2 and is activated when it is desired to brake the motor M, e.g. to accompany the change of wiping direction of the wiper system.

In the braking operating mode, the current i1 is reduced to zero and a current i2 passes through the drain-source path of the second transistor M2 that is generated by the motor M. The time for which said current i2 flows is short, and the energy in the transistor M2 is therefore lower than in the transistor M1, which explains that the transistor M2 can be dimensioned to be of lower power.

In reality, as is known, transistors of the MOSFET type, like the transistors M1 and M2 have an inherent diode constituted between the drain and the source connections. This anti-parallel diode of a MOSFET transistor is created during manufacture of the transistor. All present-day MOSFET transistors have a parasitic diode and those that do not have one are manufactured using a special method and are too costly for most uses.

Figure 2:
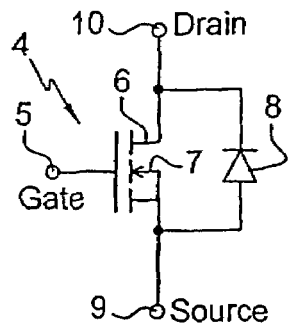

FIG. 2 shows that configuration in detail.

In FIG. 2, a MOSFET transistor 4 is shown with its gate electrode 5, its drain electrode 6, and its source electrode 7.

In particular, the transistor shown is of the MOS type having an N-channel 7. An anti-parallel diode 8 is constituted during manufacture of the transistor 4 so that its anode is connected to the source of the transistor 4 and so that its cathode is connected to the drain of the transistor 4. In fact, relative to a command on the gate 5, said diode 8 operates in parasitic manner. In particular, it tends to cause electrical energy to pass along the source-drain path in the direction opposite to the normal flow of charge carriers in the absence of a command on the gate.

In such a situation, the MOSFET transistor can easily be destroyed if the reverse current exceeds a certain threshold.

Figure 1:
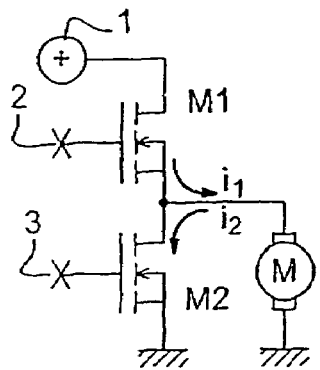
FIGS. 1 to 7 are circuit diagrams explaining the state of the art and the problems remedied by the present invention.
Figure 3:
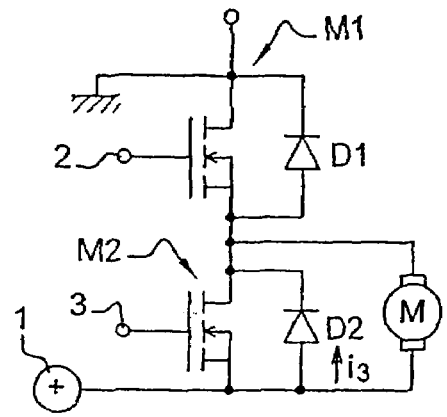

FIG. 3 shows the transistors M1 and M2 of the FIG. 1 circuit with their anti-parallel diodes D1 and D2 when they are connected erroneously with reversed polarity.

The transistors M1 and M2 and the motor M are connected as in FIG. 1.

However, the positive and the ground terminals are reversed, the drain electrode of the transistor M1 being connected to ground and the source electrode of the transistor M2 being connected to the positive terminal.

As a result, as soon as the erroneous connection is made, the drive circuit is also reverse biased and is thus not operational. The anti-parallel diodes D1 and D2 of the transistors M1 and M2 conduct and they pass a high current which is not limited by any load, and which is therefore destructive.

In general, it is the transistor M2 that is destroyed because it is dimensioned to be of a power lower than the power of the transistor M1, but the transistor M1 can also be destroyed if the transistor M2 presents a short-circuit on being destroyed.

As a result, on its drain-source path, the transistor M2 sees a current of direction opposite to the nominal direction of flow of the charge carriers, and it is irremediably destroyed if, as is usual, it is dimensioned only for braking the rotor armature of the motor M.

Figure 4:
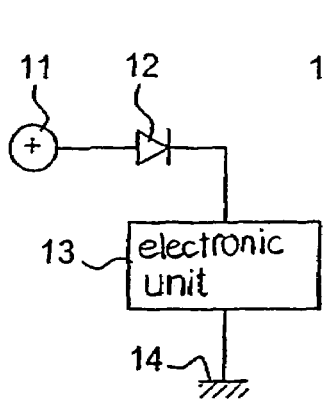

FIG. 4 shows first polarity reversal protection means taken from the above-mentioned state of the art.

The positive terminal of a biased power supply source is connected to the anode of a protection diode 12 whose cathode is connected to the input terminal or hot spot which is serves to be connected to the positive power supply terminal of an electronic unit to be protected 13.

The other biasing terminal of the electrical circuit 13 is connected to ground 14.

In this configuration, the protection diode 12 for protecting from polarity reversal gives rise to a voltage drop that can be detrimental to proper operation and, in the event that it is destroyed, interrupts the power supply to the electronic unit.

Figure 5:
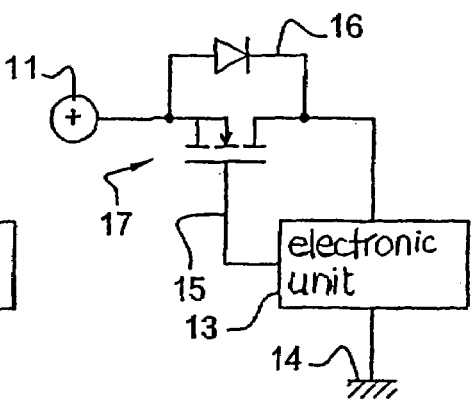

FIG. 5 shows another embodiment of a protection system of the state of the art.

In the state of the art, the positive power supply terminal 11 is transmitted to the positive input terminal of the electronic unit 13 via the drain-source of an N-channel MOSFET transistor that has a parasitic anti-parallel diode 16.

The gate of the MOSFET transistor 17 is connected to a command signal 15 formulated by the electronic unit to be protected 13.

Such a device makes it possible to reduce the voltage drop in normal operating mode by a command on the gate of the transistor 17.

However, in the event that the MOSFET transistor 17 is destroyed, the electronic unit 13 loses its power supply, which can be detrimental.

In addition, the electronic unit 13 to be protected must also be modified in order to generate a correct signal 15 for causing the MOSFET transistor 17 to conduct.

Figure 6:
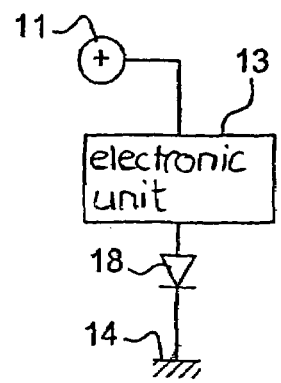

FIG. 6 shows another polarity reversal protection mode in the state of the art.

A protection diode 18 is connected between the cold spot of the electronic unit 13 to be protected and the electrical ground of the device.

This type of circuit suffers from two drawbacks caused firstly by the voltage drop induced by the diode 18 in normal operation that places the cold spot of the power supply of the electronic unit 13 at a few volts above the electrical ground of the circuit.

The other drawback also results from the fact that, in the event of a current surge, the diode 18 can accidentally be destroyed, and the electronic unit 13 is then no longer powered.

Figure 7:
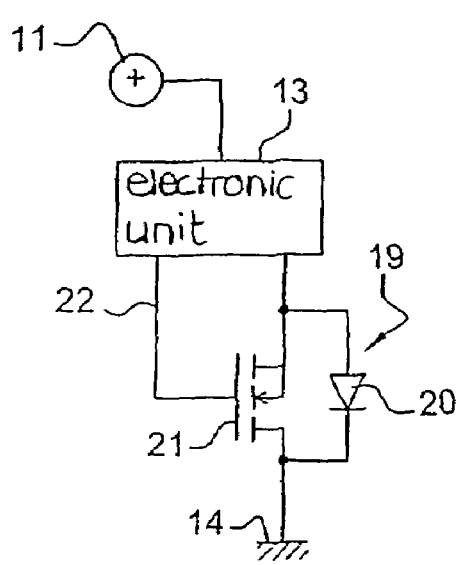

FIG. 7 shows another example of a state-of-the-art polarity reversal protection system.

In that state of the art, a MOSFET transistor 21 is placed via its drain-source path in reverse between the cold spot of the electronic power supply 13 and ground 14.

The anti-parallel diode 20 of the MOSFET transistor 19 plays the same role as the diode 18 of the example shown in FIG. 6.

However, the voltage drop can be reduced by causing conduction to take place in normal operating mode via the gate electrode 22 of the MOSFET transistor 21.

Figure 8:
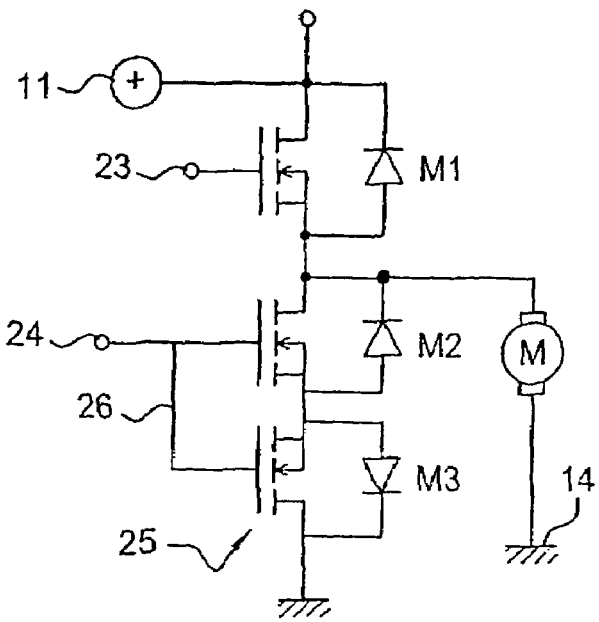
FIG. 8 is a circuit diagram of a first embodiment of the present invention.
Figure 9:
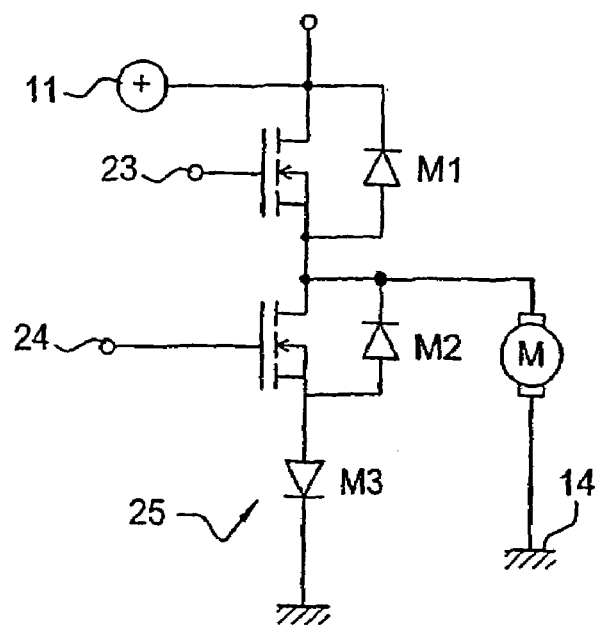
FIG. 9 is a circuit diagram of a second embodiment of the present invention.

In order to remedy the above-mentioned drawbacks of the state of the art, and in order to offer novel advantages, provisions of the invention are shown in a first embodiment in FIG. 8 and in a second embodiment in FIG. 9.

In FIGS. 8 and 9, the transistors M1 and M2 are substantially identical to the transistors M1 and M2 of the circuit of FIGS. 1 and 3.

The control circuit of the invention comprises a low-power component M3 connected in series in the braking circuit. This component has high impedance in the event of polarity reversal of the power supply of the control circuit and therefore of the motor, and low impedance in the event of correct polarity.

In one embodiment of the invention, the component M3 is a dipole which can be caused to go to its low impedance state by at least one electrode 26 connected to an armature braking control signal.

The gate electrode 23 of the high-power MOSFET-type transistor M1 is controlled directly and is placed in the active state when the motor M is to be switched on.

The low-power second MOSFET transistor is connected between the common point of connection between the electric motor and the source of the transistor M1, and is, via its source, connected to a low-impedance electric dipole for protecting from polarity reversal.

The control circuit must not activate both transistors M1 and M2 at the same time.

However, when the brake circuit is activated by a pulse on the gate electrode 24 of the second transistor M2, the low-power component 25 goes to or remains in the low-impedance state, and the braking current goes to ground via the dipole 25.

In the first embodiment of the invention shown in FIG. 8, the control circuit for controlling a DC electric motor is such that the low-power component M3 is constituted by the anti-parallel diode of a MOSFET transistor whose source is connected to the source of the transistor M2 and to the anode of its anti-parallel diode, and whose drain is connected to the cathode of the above-mentioned diode and to ground.

The gate electrode of the MOSFET transistor 25 is connected directly to the control terminal of the brake circuit 24 so that, when the polarity is appropriate, and when the circuit is activated, the transistor 25 passes the current coming from the transistor M2.

In the principle of the invention, the dipole 25 goes to or remains in the low-impedance state. In the configuration of the first embodiment shown in FIG. 8, and in the event of polarity reversal, the transistor M3 has high impedance because, in this case, its anti-parallel diode cannot conduct, since its cathode is connected to the positive terminal of the power supply source, and the transistor M3 cannot be activated because the drive circuit is reverse biased and is not operational.

In the second embodiment of the invention, shown in FIG. 9, in which elements identical to elements in FIG. 8 have like references and are not described in any more detail, the control circuit of a DC electric motor is such that the low-power component M3 is constituted by a diode connected via its cathode to the normal ground of the power supply and whose anode is connected to the source of the braking transistor M2.

In a second type of embodiment not shown in the drawing, the gate of the transistor M3 is not necessarily connected to the gate of the transistor M2. In such an embodiment, the transistor M3 can be activated (on its gate) by a permanent DC voltage coming from the drive circuit, such as, for example, the regulated voltage of the drive circuit, and therefore the transistor M3 conducts continuously so long as the power supply polarity is applied appropriately. It is the transistor M2 that allows the current to pass through the branch M2-M3. This type of configuration offers the advantage over the type of the first embodiment shown in FIG. 8 of not preventing the anti-parallel diode of the transistor M2 from being used as a recovery diode when the load is inductive, which applies when the load is constituted by an electric motor. In this type of configuration of the second embodiment, it is thus necessary to separate the controls for the gates of the transistors M2 and M3 of the first embodiment shown in FIG. 8.

In the above-defined second type of embodiment, the gate electrode of the transistor 25 is not necessarily connected to the terminal 24. The transistor 25 can be activated by an activation signal connected to its gate by a permanent DC voltage coming from the drive circuit. However, when the polarity is appropriate and when the circuit is activated, the transistor 25 does indeed pass the current coming from the transistor M2.

Conversely, when the control system is subjected to polarity reversal, the anti-parallel diode of the transistor M1 conducts.

As a result, the anti-parallel diode of the transistor M3 prevents current from passing, thereby preventing the circuit from operating.

In the event that the transistor M3 is accidentally destroyed, only the braking function is interrupted.

In particular, since the gate electrodes of the transistors M2 and M3 are connected to the same external control terminal for connection to a drive circuit (not shown) of the control circuit of the invention, it is very easy to mount the two transistors M2 and M3 on a common support, e.g. on a brake circuit support.

Such mounting on a common support can be used even if the gates of the transistors M2 and M3 are not connected together as in the second embodiment described above. Nevertheless, it is possible to use packages incorporating two transistors of the same size in order to save space on the support, e.g. a printed circuit. The gates of each transistor remain accessible separately, which makes it possible to apply different voltages to each of them.

As is known, a transistor M2 can be mounted in a half-bridge configuration with the high-power transistor M1 on a single, common support such as a printed circuit with heat sinks or an integrated circuit.

In the invention, it is then possible to mount the transistors M1, M2 and the polarity reversal protection MOSFET transistor together on a single, common support such as a printed circuit and/or an integrated circuit.

A wiper system of the invention can incorporate a half-bridge of the type shown in FIG. 8 and which is connected directly to a wiper electric motor.

A drive circuit is added in order to connect the gate electrodes of the transistors M2 and M3 of the brake circuit to a braking control terminal, and the gate electrode of the transistor M1 is connected to a control terminal for switching on the electric motor either by means of a pulse command or else by means of a periodic command voltage for driving the electric motor in voltage-regulated manner with pulses of width controlled by the drive circuit as a function of setpoints (pulse width modulation (PWM) mode).

It should be noted that in the second type of embodiment and not shown in the drawings, the gates of the transistors M2 and M3 are not necessarily connected together, but rather they can be connected to suitable control terminals of their control circuit.

In one embodiment, the control circuit generates a pulse command or a PWM command using the configuration of FIG. 8. A thyristor can be used for a pulse command, and it replaces the transistors M2 and M3. But the absence of recovery diode then constitutes a drawback.

The invention claimed is:

1. A control circuit for controlling a DC electric motor from a biased DC voltage source, comprising:
   at least one controllable interrupter connected to an input terminal of the electric motor;
   a brake circuit serving to apply a braking short-circuit for braking the DC electric motor; and
   a low-power component connected in series with the brake circuit and having a high impedance in the event of polarity reversal and a low impedance in the event of correct polarity,
   wherein the low-power component comprises an anti-parallel diode of a MOSFET transistor connected via a cathode thereof to a ground of the voltage source.

2. The control circuit for controlling a DC electric motor according to claim 1, wherein the low-power component is a dipole which can be caused to go to its low-impedance state by at least one electrode connected to an armature braking control signal.

3. The control circuit for controlling a DC electric motor according to claim 2, wherein the low-power component comprises a thyristor optionally supplemented by a recovery diode.

4. The control circuit for controlling a DC electric motor according to claim 1, wherein low-power component is integrated on the same support as the brake circuit.

5. The control circuit for controlling a DC electric motor according to claim 1, wherein the low-power component is integrated on the same support as the control circuit.

6. A vehicle windshield wiper system, comprising:
an electric motor;
a control circuit according to one of claims 1-3 and
a drive circuit for placing the control circuit in an ON state or in a braking state.

7. The wiper system according to claim 6, wherein the drive circuit comprises means for activating the low-power component of the control circuit by means of a pulse command or by means of a pulse width modulation (PWM) command.

8. A The wiper system according to claim 6, wherein the drive circuit comprises means for activating the brake circuit of the control circuit by a pulse width modulation command, and wherein the low-power component is maintained active by a separate voltage command, when the polarity of the system is correct.

9. The wiper system according to claim 8, wherein the separate voltage command is a regulated power supply voltage of the drive circuit.

* * * * *

UNITED STATES PATENT AND TRADEMARK OFFICE
CERTIFICATE OF CORRECTION

| | | |
|---|---|---|
| PATENT NO. | : 7,268,508 B2 | Page 1 of 1 |
| APPLICATION NO. | : 10/545698 | |
| DATED | : September 11, 2007 | |
| INVENTOR(S) | : Dominique Caillaud et al. | |

It is certified that error appears in the above-identified patent and that said Letters Patent is hereby corrected as shown below:

In the Claims:

In claim 4, column 7, line 6, after the word, "wherein" please add the word --the--.

In claim 6, column 7, line 13, after the word "claims" the numbers "1-3" should be --1-5--.

Signed and Sealed this

Twenty-fifth Day of December, 2007

JON W. DUDAS
*Director of the United States Patent and Trademark Office*